(12) United States Patent
Kim et al.

(10) Patent No.: US 11,488,003 B2
(45) Date of Patent: Nov. 1, 2022

(54) ARTIFICIAL NEURAL NETWORK APPARATUS AND OPERATING METHOD FOR THE SAME

(71) Applicant: ELECTRONICS AND TELECOMMUNICATIONS RESEARCH INSTITUTE, Daejeon (KR)

(72) Inventors: Ju-Yeob Kim, Daejeon (KR); Byung Jo Kim, Sejong-si (KR); Seong Min Kim, Sejong-si (KR); Jin Kyu Kim, Incheon (KR); Mi Young Lee, Daejeon (KR); Joo Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 845 days.

(21) Appl. No.: 16/409,437

(22) Filed: May 10, 2019

(65) Prior Publication Data

US 2019/0362224 A1 Nov. 28, 2019

(30) Foreign Application Priority Data

May 23, 2018 (KR) .................. 10-2018-0058618

(51) Int. Cl.
| | |
|---|---|
| *G06K 9/62* | (2022.01) |
| *G06N 3/063* | (2006.01) |
| *G06F 9/30* | (2018.01) |
| *G06N 3/04* | (2006.01) |
| *G06V 10/82* | (2022.01) |

(52) U.S. Cl.
CPC ......... *G06N 3/063* (2013.01); *G06F 9/30021* (2013.01); *G06F 9/30094* (2013.01); *G06N 3/04* (2013.01); *G06V 10/82* (2022.01)

(58) Field of Classification Search
CPC ............ G06N 3/063; G06N 3/06; G06N 3/02; G06V 10/82; G06V 10/70; G06V 30/18057; G06V 10/454; G06F 9/30021; G06F 9/30003; G06F 9/30; G06F 9/06; G06F 9/3009; G06T 2207/20; G06T 2207/20081; G06T 2207/20084
See application file for complete search history.

(56) References Cited

U.S. PATENT DOCUMENTS

| | | |
|---|---|---|
| 2011/0213743 A1 | 9/2011 | Choi et al. |
| 2014/0177946 A1 | 6/2014 | Lim et al. |
| (Continued) | | |

FOREIGN PATENT DOCUMENTS

KR      20170096298 A      8/2017

*Primary Examiner* — Duy M Dang
(74) *Attorney, Agent, or Firm* — Rabin & Berdo, P.C.

(57) ABSTRACT

An artificial neural network apparatus and an operating method including a plurality of layer processors for performing operations on input data are disclosed. The artificial neural network apparatus may include: a flag layer processor for outputting a flag according to a comparison result between a pooling output value of a current frame and a pooling output value of a previous frame; and a controller for stopping operation of a layer processor which performs operations after the flag layer processor among the plurality of layer processors when the flag is outputted from the flag layer processor, wherein the flag layer processor is a layer processor that performs a pooling operation first among the plurality of layer processors.

9 Claims, 6 Drawing Sheets

(56) References Cited

U.S. PATENT DOCUMENTS

2017/0041540 A1     2/2017   Foster et al.
2018/0232606 A1*   8/2018   Park ................... G06K 9/6256
2019/0205780 A1*   7/2019   Sakaguchi ........... G06K 9/6232

* cited by examiner

ARTIFICIAL NEURAL NETWORK APPARATUS AND OPERATING METHOD FOR THE SAME

CROSS-REFERENCE TO RELATED APPLICATION

This application claims priority to and the benefit of Korean Patent Application No. 10-2018-0058618 filed in the Korean Intellectual Property Office on May 23, 2018, the entire contents of which are incorporated herein by reference.

BACKGROUND OF THE INVENTION

(a) Field of the Invention

The present invention relates to an artificial neural network apparatus and an operating method thereof that minimize power consumption.

(b) Description of the Related Art

A neural network is used in the field of identifying objects and objects included in an image through data received from a camera and an image acquisition device. An artificial neural network, which is a Convolutional Neural Network (CNN) model, may be implemented with digital circuits and chips.

When data is input to the conventional CNN model, all layers from an input layer to an output layer are activated to generate recognition results of the object in the image. At this time, power for the neural network applied to the image recognition field is excessively consumed.

Most of the input image is generally the same as the temporally previous frame or there is no change of the object. Since the conventional CNN model does not recognize this, there is a problem in that the hardware is operated from the input layer to the output layer in the same manner regardless of states of input data, resulting in excessive power consumption.

In addition, hardware implemented based on an artificial neural network has high power consumption in terms of operation scale. The power consumption required to complete a series of processes from feature generation to object recognition often exceeds battery performance of portable devices.

SUMMARY OF THE INVENTION

According to one embodiment of the present disclosure, an artificial neural network apparatus for determining a recognition state of input data in an initial layer to determine whether to operate subsequent layers is provided.

According to another embodiment of the present disclosure, an operating method for determining a recognition state of input data in an initial layer to determine whether to operate subsequent layers is provided.

According to an embodiment of the present disclosure, an artificial neural network apparatus including a plurality of layer processors for performing operations on input data is provided, the artificial neural network apparatus including: a flag layer processor for outputting a flag according to a comparison result between a pooling output value of a current frame and a pooling output value of a previous frame; and a controller for stopping operation of a layer processor which performs operations after the flag layer processor among the plurality of layer processors when the flag is outputted from the flag layer processor, wherein the flag layer processor is a layer processor that performs a pooling operation first among the plurality of layer processors.

The flag layer processor may output the flag when the pooling output value of the current frame is equal to the pooling output value of the previous frame.

The pooling output value of the current frame and the pooling output value of the previous frame may be position information stored according to a comparison result between a pooling operation value and a previously stored reference value.

The flag layer processor may include a memory for storing the pooling output value of the current frame and the pooling output value of the previous frame.

The artificial neural network apparatus may further include a comparator for comparing the pooling output value of the current frame with the pooling output value of the previous frame, and outputting the flag when the pooling output value of the current frame and the pooling output value of the previous frame are the same.

According to another embodiment of the present disclosure, an artificial neural network apparatus including a plurality of layer processors for performing operations on input data is provided, the artificial neural network apparatus including: a flag layer processor for outputting a flag when position information of a current frame and position information of a previous frame respectively stored in accordance with comparison results between pooling operation values and previously stored reference values are the same; and a controller for stopping operation of a layer processor which performs operations after the flag layer processor among the plurality of layer processors when the flag is outputted from the flag layer processor, wherein the flag layer processor is a layer processor that performs a pooling operation first among the plurality of layer processors.

According to another embodiment of the present disclosure, an operating method of an artificial neural network apparatus including a plurality of layer processors for performing operations on input data is provided, the operating method including: outputting a flag according to a comparison result between a pooling output value of a current frame and a pooling output value of a previous frame; and stopping operation of a layer processor which performs operations after the flag layer processor among the plurality of layer processors when the flag is outputted from the flag layer processor.

The outputting a flag may output the flag when the pooling output value of the current frame is equal to the pooling output value of the previous frame.

The outputting a flag may perform operations on input data, may store pooling output values according to a comparison result between a pooling operation value and a previously stored reference value, and may output the flag according to a comparison result between the stored pooling output value of the current frame and the stored pooling output value of the previous frame.

According to an artificial neural network apparatus and an operating method thereof, power consumption due to false recognition may be minimized and power consumption of the image recognition hardware consumed at all times may be minimized.

DETAILED DESCRIPTION OF THE EMBODIMENTS

Figure 1:
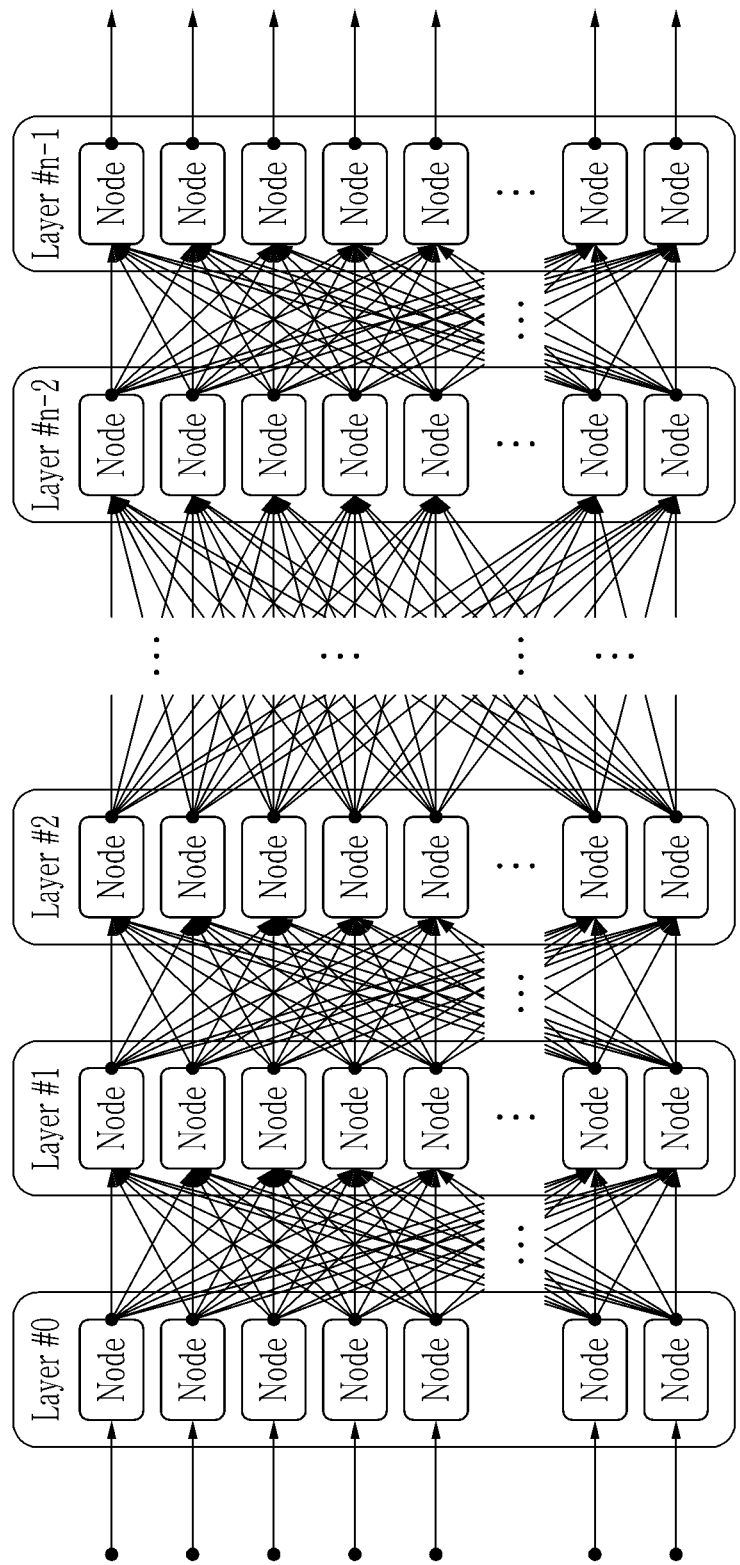
FIG. 1 is a schematic diagram of an artificial neural network.

Hereinafter, exemplary embodiments of the present disclosure will be described in detail with reference to the accompanying drawings so that those skilled in the art may easily practice the present disclosure. However, the present disclosure may be modified in various different ways and is not limited to embodiments described herein. In the accompanying drawings, portions unrelated to the description will be omitted in order to obviously describe the present disclosure, and similar reference numerals will be used to describe similar portions throughout the present specification.

Throughout the present specification and the claims, unless explicitly described to the contrary, the word "comprise" and variations such as "comprises" or "comprising" will be understood to imply the inclusion of stated elements but not the exclusion of any other elements.

FIG. 1 is a schematic diagram of an artificial neural network.

Referring to FIG. 1, when input data is input to an artificial neural network, all layers from a layer for processing input data to a layer for outputting a recognition result are activated.

Figure 2:
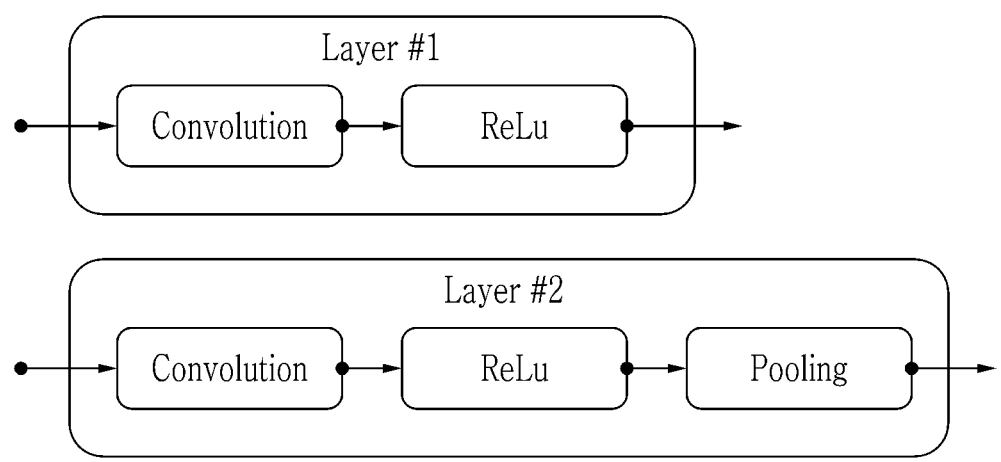
FIG. 2 is a schematic diagram illustrating an operation process of an artificial neural network layer.

FIG. 2 is a schematic diagram illustrating an operation process of an artificial neural network layer.

Referring to FIG. 2, an artificial neural network layer of the Convolutional Neural Network (CNN) model having an image recognition function performs convolution, ReLu (Rectified Linear Unit), and pooling.

Since an amount of data is generally reduced to about half or one quarter of a total amount of input data in the pooling, the pooling is suitable for comparing values between a previous frame and a current frame. Since operation in the pooling reflects position information of an object on the two-dimensional plane, it is possible to compare the position information between the previous frame and the current frame.

Figure 3:
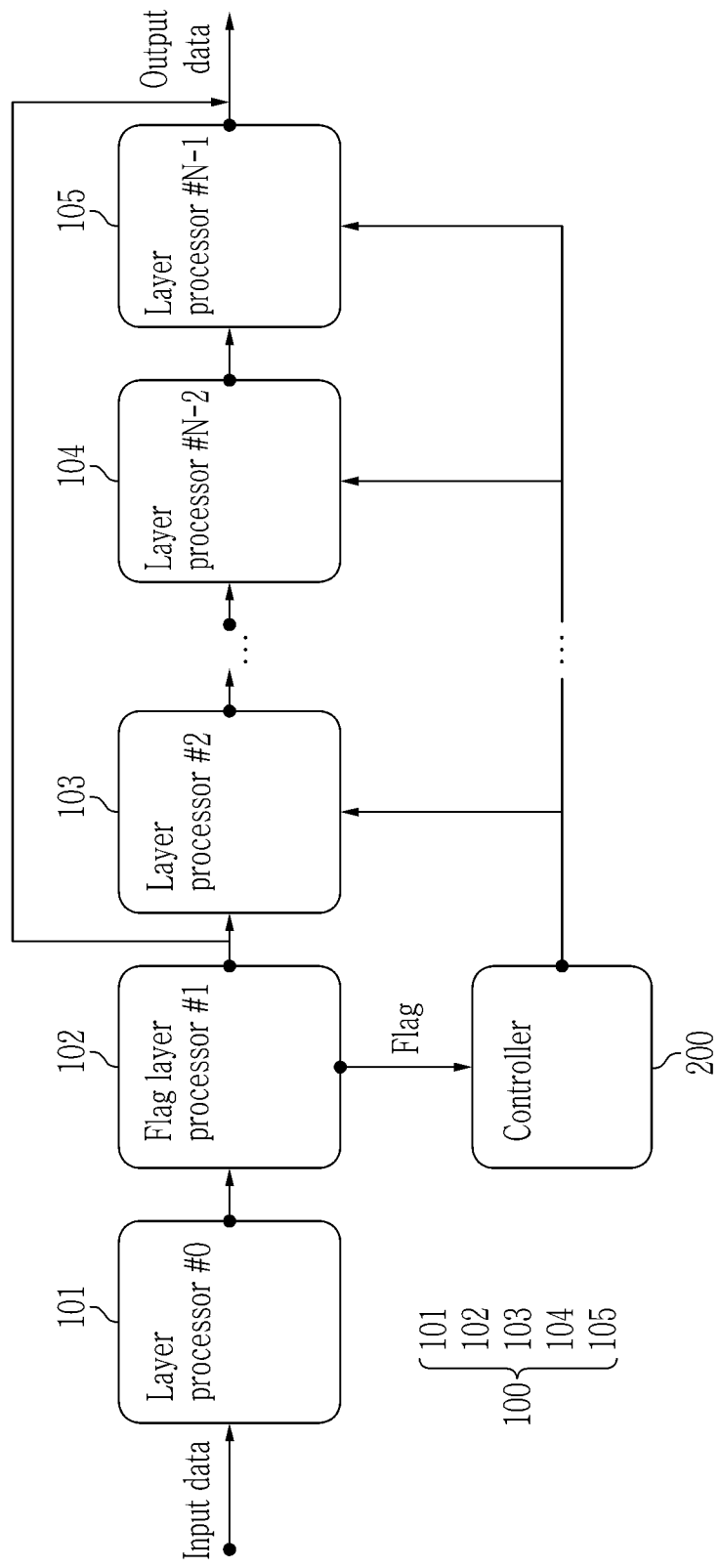
FIG. 3 is a block diagram of an artificial neural network apparatus according to an exemplary embodiment.

FIG. 3 is a block diagram of an artificial neural network apparatus according to an exemplary embodiment.

Referring to FIG. 3, an artificial neural network apparatus includes a plurality of layer processors 100 and a controller 200 according to an exemplary embodiment.

A flag layer processor 102 that performs a pooling operation first among the plurality of layer processors 100 outputs a flag according to a comparison result between a pooling output value of a current frame and a pooling output value of a previous frame. Specifically, the flag layer processor 102 outputs the flag when the pooling output value of the current frame and the pooling output value of the previous frame are the same. The flag layer processor 102 may be a first half layer module or an initial layer module for recognizing brightness and a low dimensional shape of a pixel and performing first pooling. When the flag layer processor 102 is the first layer module, a layer processor which performs operations after the flag layer processor may be a second half layer module.

Figure 4:
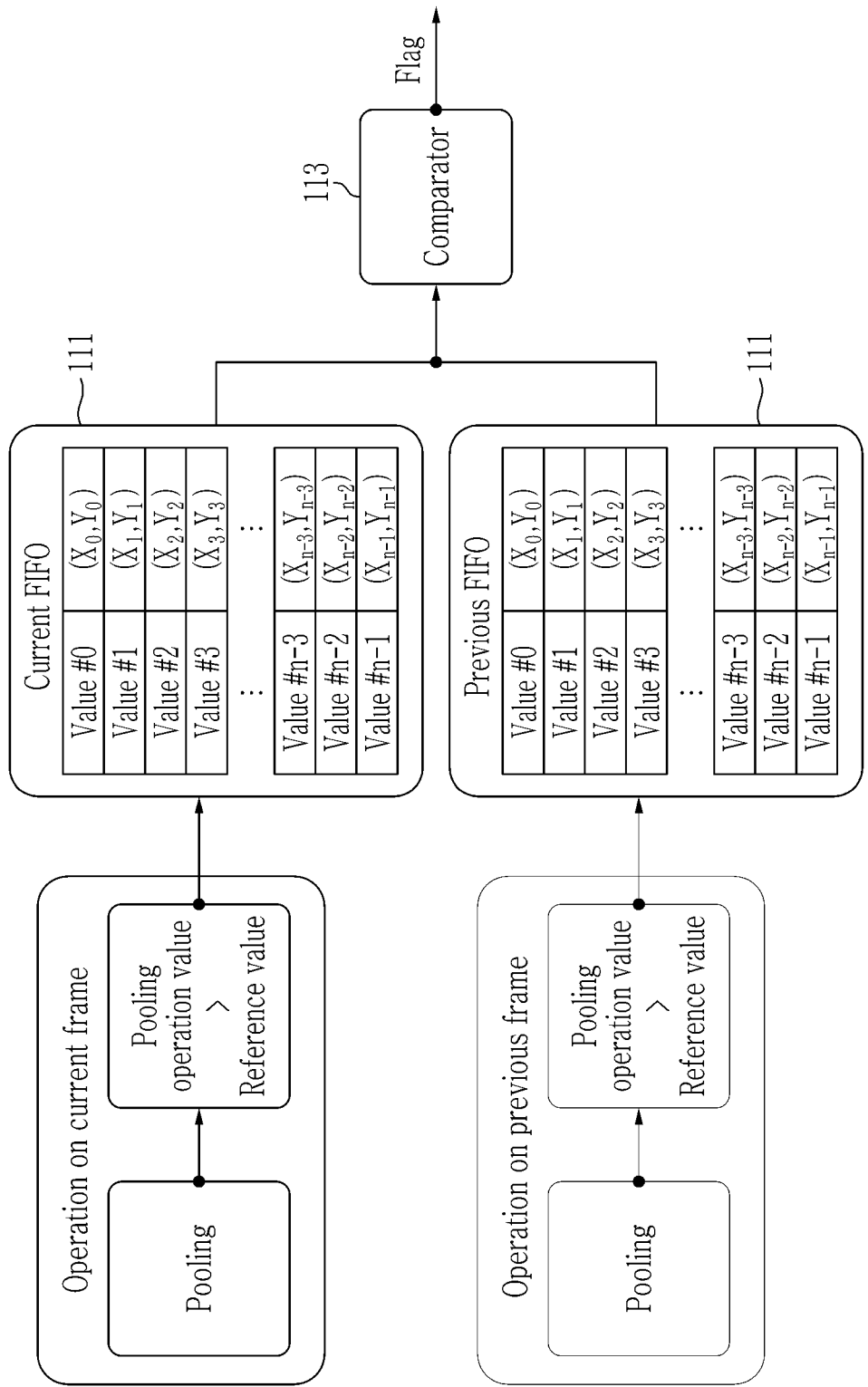
FIG. 4 is a block diagram of a flag processor according to an exemplary embodiment.

FIG. 4 is a block diagram of a flag processor according to an exemplary embodiment.

Referring to FIG. 4, The flag layer processor 102 according to an exemplary embodiment includes a memory 111 for storing the pooling output value of the current frame and the pooling output value of the previous frame, and a comparator 113 for comparing the pooling output value of the current frame with the pooling output value of the previous frame and for outputting the flag when the pooling output value of the current frame and the pooling output value of the previous frame are the same.

The pooling output value stored in the memory 111 is a value stored according to a comparison result between a pooling operation value and a previously stored reference value. Specifically, the pooling output value is position information stored in the order of the pooling operation when the pooling output value of the current frame is larger than the previously stored reference value. The memory 111 may be a FIFO (First In First Out) buffer. The reference value may be determined in advance through experiments and tests and stored in the FIFO, and may be modified during operation.

The comparator 113 compares position information, which is the pooling output value of the current frame stored in the FIFO, with position information, which is the pooling output value of the previous frame stored in the FIFO, and outputs a flag based on the comparison result. The flag is a signal for determining whether to operate a layer processor 103 which performs operations after performing an operation of the flag layer processor 102 (i.e., which receives output data of the flag layer processor 102 and performs operations).

Referring to FIG. 3, the controller 200 determines whether to operate the layer processor 103, which is the second half layer module, according to whether a flag of the flag layer processor 102 is received or not. Specifically, when the flag is received from the flag layer processor 102, the controller 200 stops operation of the layer processor 103 which performs operations after the flag layer processor 102.

When the operation of the layer processor 103 is stopped, result values calculated by the flag layer processor 102 become output data. On the other hand, since the layer processor 103 does not output the flag when the pooling output value of the current frame is different from the pooling output value of the previous frame, result values calculated by processors 103, 104, and 105 following the flag layer processor 102 become output data.

Figure 5:
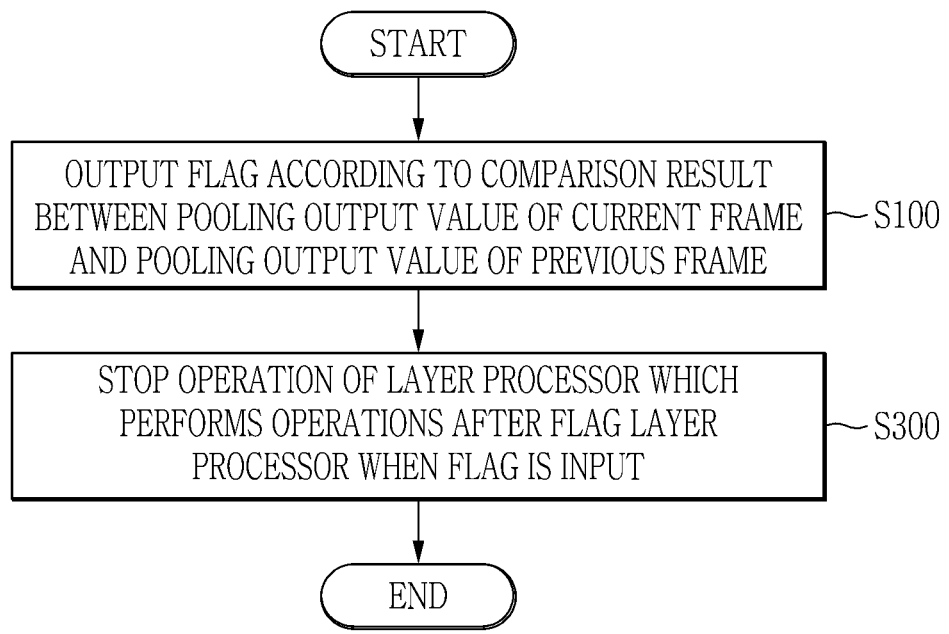
FIG. 5 is a flowchart of an operating method of an artificial neural network apparatus according to an exemplary embodiment.

FIG. 5 is a flowchart of an operating method of an artificial neural network apparatus according to an exemplary embodiment.

Referring to FIGS. 3 and 5, an operating method of an artificial neural network apparatus according to an exemplary embodiment includes outputting, by a flag layer processor 102, a flag according to a comparison result between a pooling output value of a current frame and a pooling output value of a previous frame (S100), and stopping, by a controller 200, operation of a layer processor 103 which performs operations after performing an operation of the flag layer processor 102 when the controller 200 receives the flag (S300).

Figure 6:
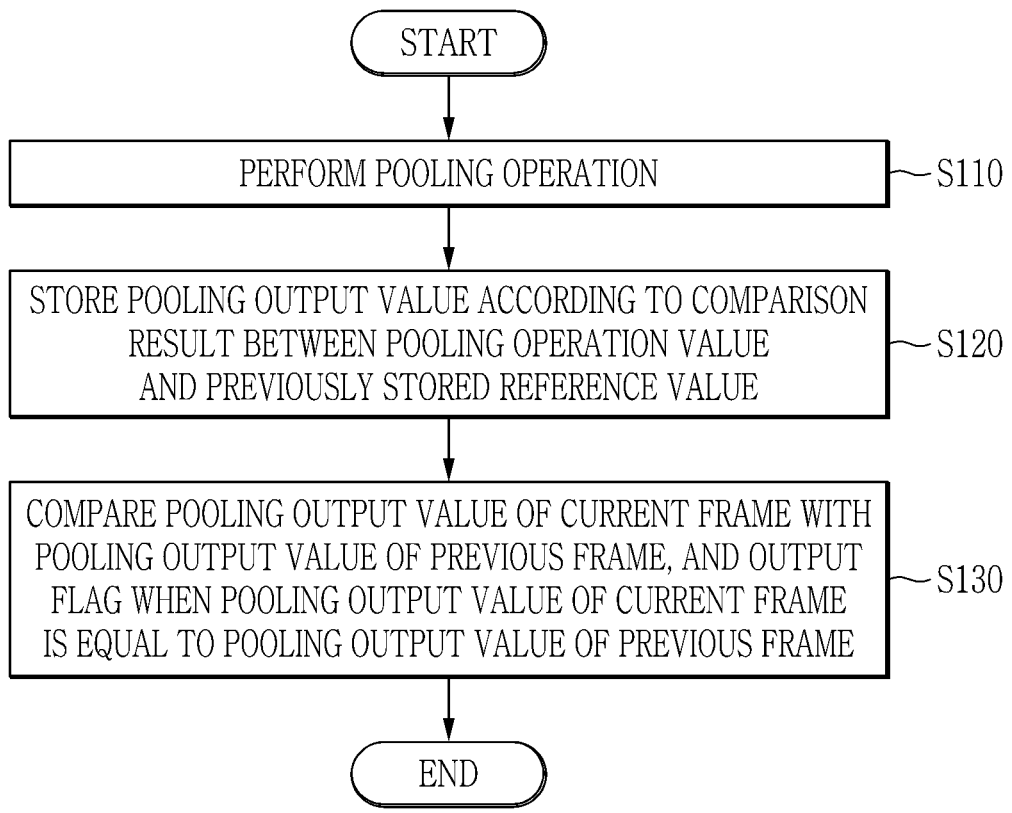
FIG. 6 is a flowchart for explaining a step of outputting a flag of an operating method of an artificial neural network apparatus according to an exemplary embodiment.

FIG. 6 is a flowchart for explaining a step of outputting a flag of an operating method of an artificial neural network apparatus according to an exemplary embodiment.

The outputting a flag (S100) performs operations on input data (S110), stores pooling output values according to a comparison result between a pooling operation value and a previously stored reference value (S120), and outputs the flag according to a comparison result between the stored pooling output value of the current frame and the stored pooling output value of the previous frame (S130). The outputting a flag (S100) is the same as the operation of the flag layer processor 102 described above, so detailed description will be omitted.

The step S300 of interrupting the operation of the layer processor 103 is the same as the operation of the controller 200 described above, and thus a detailed description thereof will be omitted. The stopping operation of a layer processor 103 is the same as the operation of the controller 200 described above, so detailed description will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An artificial neural network apparatus including a plurality of layer processors for performing operations on input data, comprising:
   a flag layer processor for outputting a flag according to a comparison result between a pooling output value of a current frame and a pooling output value of a previous frame; and
   a controller for stopping operation of a layer processor which performs operations after the flag layer processor among the plurality of layer processors, when the flag is outputted from the flag layer processor,
   wherein the flag layer processor is a layer processor that performs a pooling operation first among the plurality of layer processors.

2. The artificial neural network apparatus of claim 1, wherein
   the flag layer processor outputs the flag when the pooling output value of the current frame is equal to the pooling output value of the previous frame.

3. The artificial neural network apparatus of claim 1, wherein
   the pooling output value of the current frame and the pooling output value of the previous frame are position information stored according to a comparison result between a pooling operation value and a previously stored reference value.

4. The artificial neural network apparatus of claim 1, wherein
   the flag layer processor includes a memory for storing the pooling output value of the current frame and the pooling output value of the previous frame.

5. The artificial neural network apparatus of claim 1, further comprising:
   a comparator for comparing the pooling output value of the current frame with the pooling output value of the previous frame, and outputting the flag when the pooling output value of the current frame and the pooling output value of the previous frame are the same.

6. An artificial neural network apparatus including a plurality of layer processors for performing operations on input data, comprising:
   a flag layer processor for outputting a flag when position information of a current frame and position information of a previous frame respectively stored in accordance with comparison results between pooling operation values and previously stored reference values are the same; and
   a controller for stopping operation of a layer processor which performs operations after the flag layer processor among the plurality of layer processors when the flag is outputted from the flag layer processor,
   wherein the flag layer processor is a layer processor that performs a pooling operation first among the plurality of layer processors.

7. An operating method of an artificial neural network apparatus including a plurality of layer processors for performing operations on input data, comprising:
   outputting a flag according to a comparison result between a pooling output value of a current frame and a pooling output value of a previous frame; and
   stopping operation of a layer processor which performs operations after the flag layer processor among the plurality of layer processors when the flag is outputted from the flag layer processor.

8. The operating method of claim 7, wherein
   the outputting a flag outputs the flag when the pooling output value of the current frame is equal to the pooling output value of the previous frame.

9. The operating method of claim 7, wherein
   the outputting a flag performs operations on input data, stores pooling output values according to a comparison result between a pooling operation value and a previously stored reference value, and outputs the flag according to a comparison result between the stored pooling output value of the current frame and the stored pooling output value of the previous frame.

* * * * *